Aug. 10, 1937.　　　　F. S. WHITE　　　　2,089,517
PLANTER
Filed Dec. 15, 1936　　　3 Sheets-Sheet 1
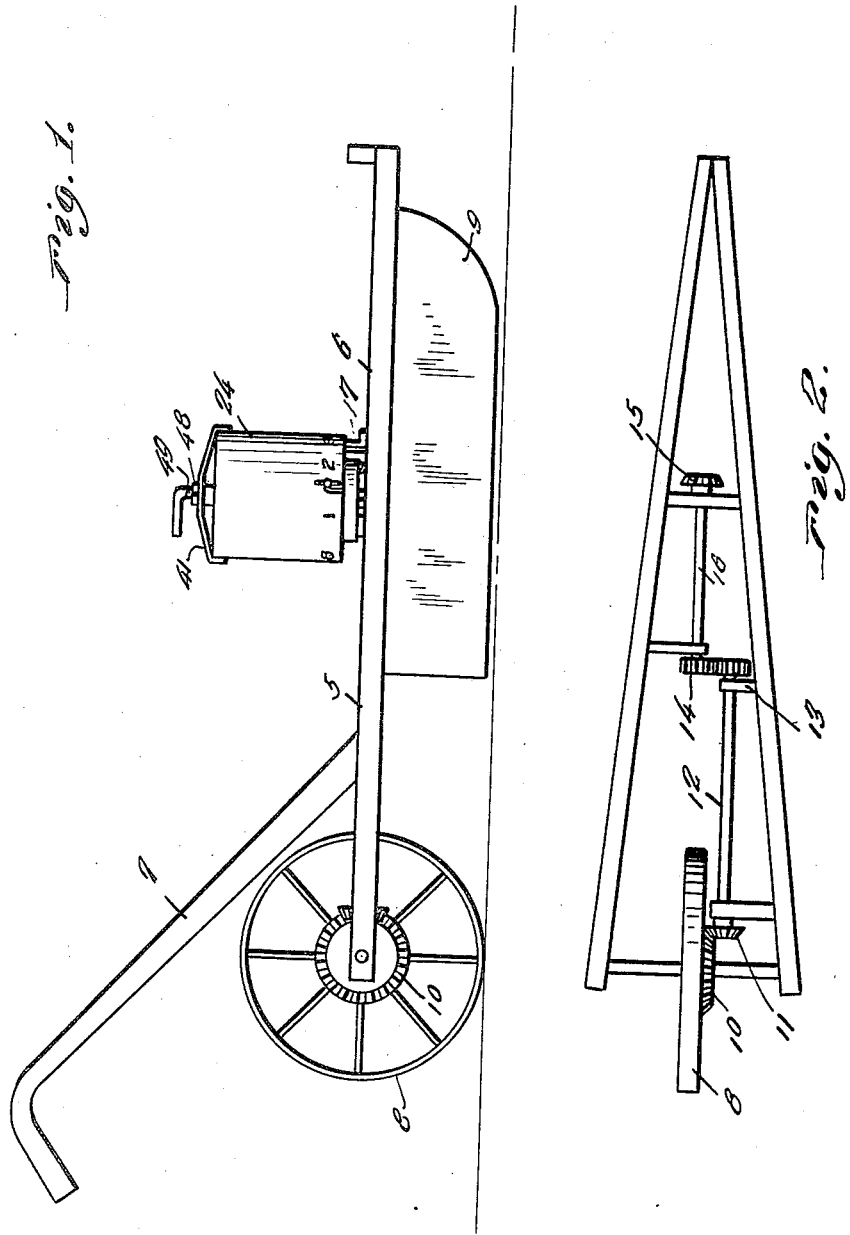
Inventor
F. S. White
By Clarence A. O'Brien
Hyman Berman
Attorneys

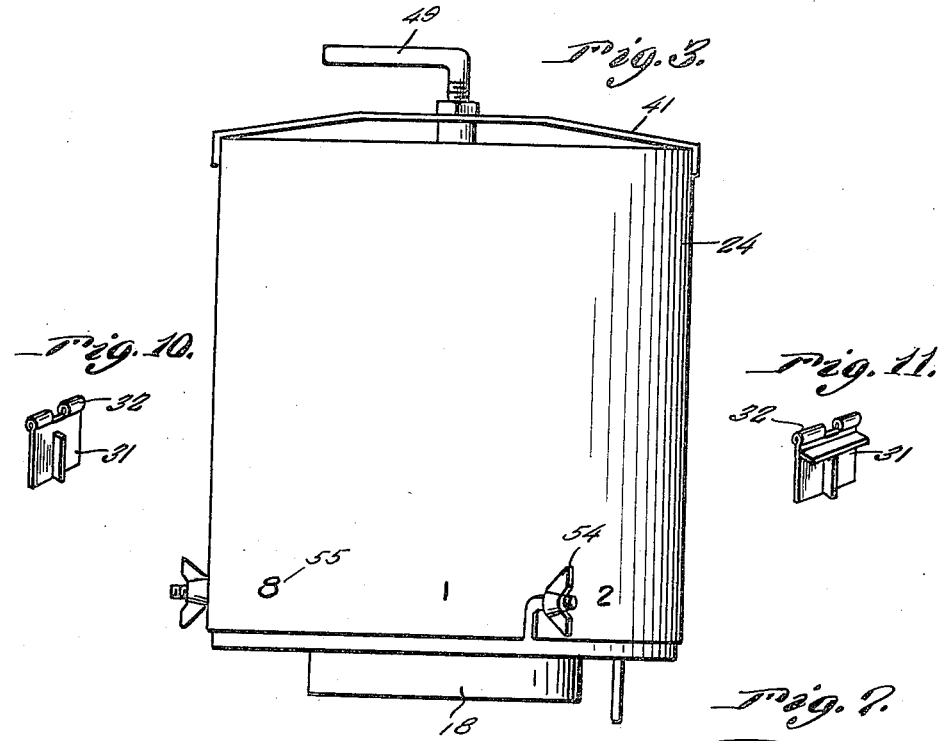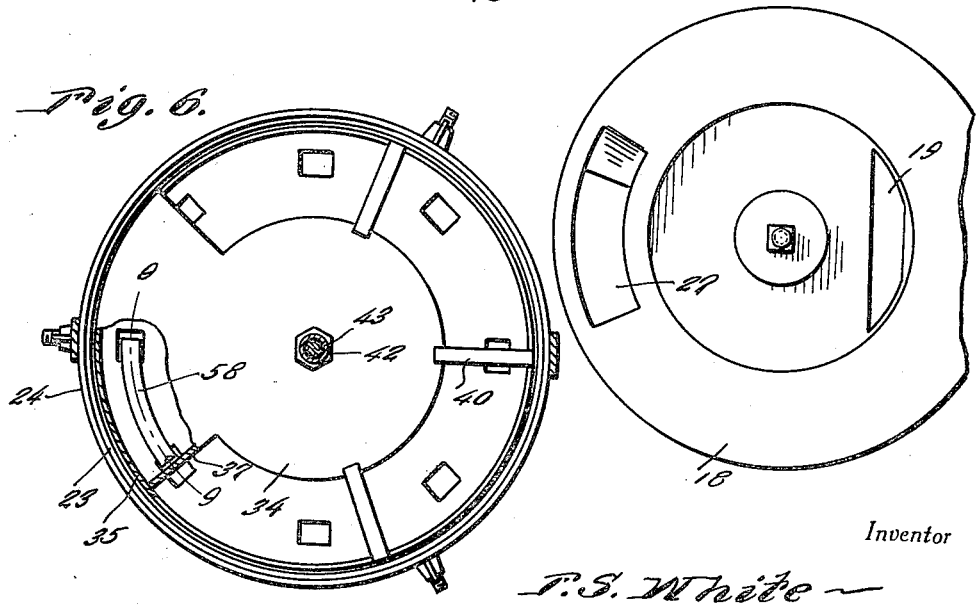

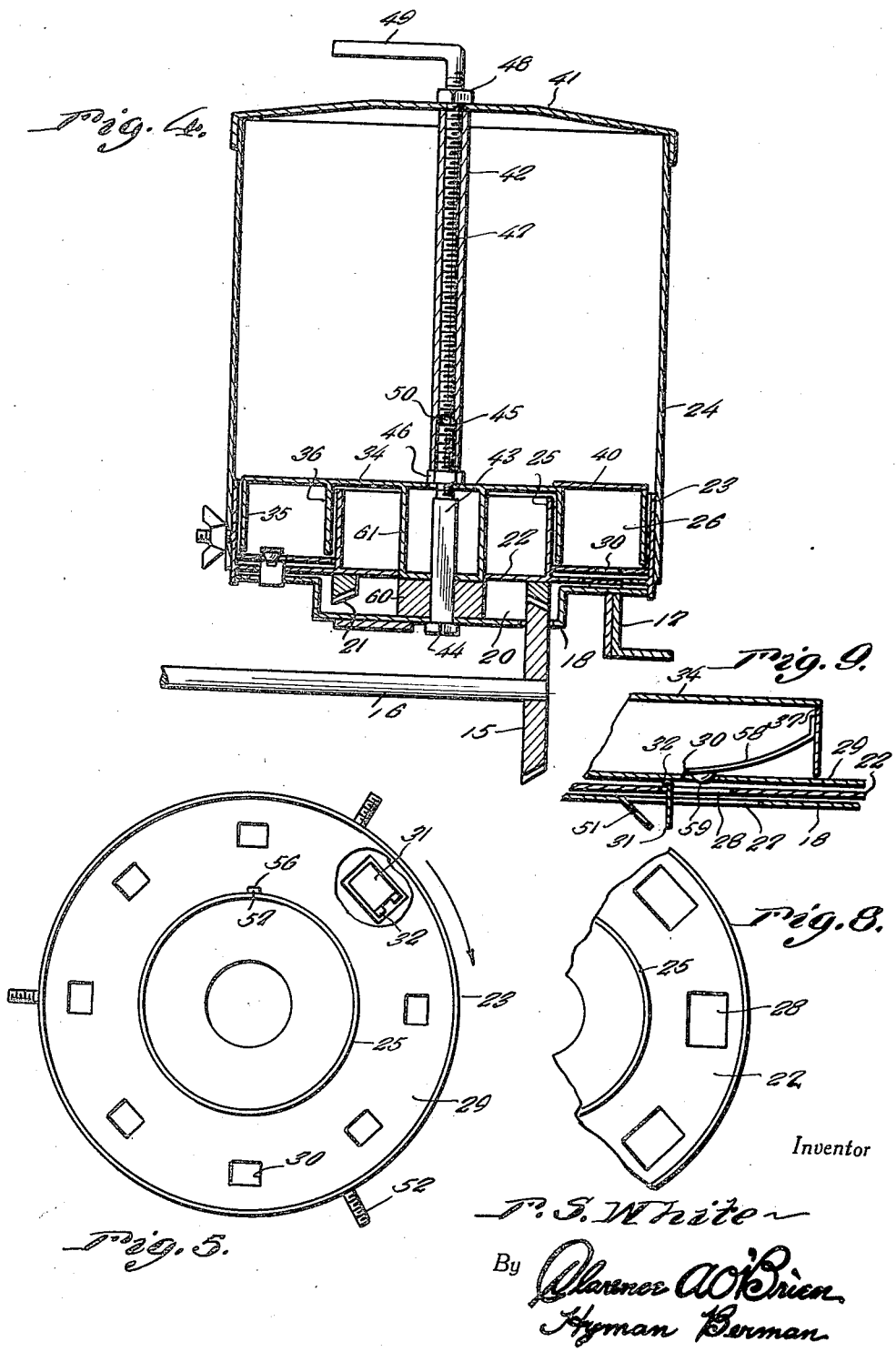

Patented Aug. 10, 1937

2,089,517

UNITED STATES PATENT OFFICE 2,089,517

PLANTER

Fred S. White, Hickory Plains, Ark.

Application December 15, 1936, Serial No. 115,993

4 Claims. (Cl. 221—138)

The present invention relates to planters of a type commonly known as check row planters, designed for planting corn, cotton and similar seed and has for its principal object to provide a rotatable seed receptacle embodying means for depositing the seed at predetermined intervals together with indicating means corresponding to the depositing opening associated with the container to indicate the particular opening from which the seed was last deposited.

A further object is to provide a seed planter embodying a rotatable container having operative connection with the drive wheel of the planter, which is efficient and reliable in performance, relatively inexpensive to manufacture and otherwise well adapted for the purpose for which the same is intended.

Other objects and advantages reside in the details of construction and operation as more fully hereinafter described and claimed, reference being had to the accompanying drawings forming part hereof wherein like numerals refer to like parts throughout and in which:—

Figure 1 is a side elevational view of the planter embodying the present invention.

Figure 2 is a top plan view with the seed container removed.

Figure 3 is a side elevational view of the seed container.

Figure 4 is a vertical sectional view therethrough.

Figure 5 is a plan view of the bottom plate for the container showing the relative position of one of the gates arranged for controlling the openings in the plate.

Figure 6 is a plan view of the container with the top removed and with parts broken away and shown in section.

Figure 7 is a bottom plan view of the container.

Figure 8 is a fragmentary plan view of the plate 22.

Figure 9 is a fragmentary sectional view taken substantially on a line 9—9 of Figure 6, and Figures 10 and 11 are perspective views of the gate.

Referring now to the drawings in detail, wherein for the purpose of illustration I have disclosed a preferred embodiment of the invention, the numeral 5 designates a planter generally which includes a frame 6 having handle 7 secured thereto, one end of the frame being supported upon a wheel 8. The forward part of the frame 6 is provided with a covering shoe 9. The hub of the wheel 8 is formed with a bevelled gear 10 with which a gear 11 is engaged, said gear being mounted on a shaft 12 journaled in brackets 13 and extending forwardly and connected by means of gears 14—14 with a shaft 16 for driving a pinion 15.

Supported upon the frame by upstanding brackets 17 is a stationary plate 18 having an opening 19 through which one edge of the pinion 15 operates, the central portion of the plate 18 being recessed as shown at 20 to accommodate a gear 21 formed on the underside of an intermediate plate 22. The plates 18 and 22 are of annular construction and the outer periphery of the plate 22 is formed with an annular flange 23, said flange being positioned inwardly of the lower edge of a drum 24 and suitably secured thereto for rotation with the plate 22 by means of bolts 52 inserted in bayonet slots 53 in the drum and secured by wing nuts 54. The plate 22 is also provided with an annular flange 25 extending upwardly therefrom in spaced concentric relation with respect to the flange 23 to provide a channel 26 between said flanges.

The plate 18 is provided with an arcuate discharge opening 27 adjacent its peripheral edge and the plate 22 is provided with a series of discharge openings 28 positioned within the channel 26. Positioned within the channel 26 and removably secured to the plate 22 by interengaging lugs 56 and notches 57 is a flat ring member 29 having openings 30 therein registering with the openings 28, the underside of the ring 29 being provided with gates 31 pivoted at one end by bearings 32 to the underside of said ring and adapted to close the respective openings 30.

As more clearly illustrated in Figure 9 of the drawings, the gates are positioned between the plates 22 and 29 and are swingable downwardly through the openings 28 of the plate 22.

Mounted above the plate 22 is a stationary segmental plate member 34 which forms the bottom of the drum 24, said plate 34 having an outer annular flange 35 extending downwardly from the periphery thereof and an inner annular flange 36, both of said flanges being positioned within the channel 26 as will be clearly apparent from an inspection of Figure 4 of the drawings. Between the flanges 35 and 36 are arranged a pair of substantially radially extending partitions 37 positioned within the channel 26. Braces 40 also extend between the flanges 35 and 36. A block 60 supports the central portion 61 of the plate 34 in spaced relation above the plate 18.

The top of the drum is open and is provided with radially extended braces 41 connected at the center of the drum with a tube 42 disposed axially of the drum. The plates 18, 22, and 34 are provided with aligned central openings through which a rod 43 extends upwardly therethrough, the lower end of the rod having a head 44 abutting the bottom of the plate 18 and the upper portion of the rod being inserted into the tube 42 and threaded as at 45 for receiving a jam nut 46 to secure the plate in position. A threaded rod 47 is also inserted downwardly through the top of the tube and secured by a jam nut 48 engaging the outer end of the tube. The outer end of the rod is formed with an angular extension 49 to constitute a handle and the adjacent inner ends of the rods 43 and 47 have a ball 50 interposed therebetween to permit of the rotation of the upper rod 47 together with the drum.

The plate 18, adjacent the opening 27 is provided with a trip 51 struck down from the body of the plate and positioned adjacent said opening whereby it will be apparent that during the rotation of the drum the seed entering the channel 26 will enter the openings 28 and 30 between the plate 22 and ring 29 and as the same are rotated will be deposited through the opening 27. As the gates 31 contact the trip 51 the same will be closed to prevent any additional seeds being dropped until the drum is further rotated. A leaf spring 58 secured to one of the partitions 37 and provided with a knob 59 contacts the gate to force the same open.

The outer surface of the drum is provided with numerals 55 placed opposite the openings in the plates 22 and 29 to indicate the position thereof and to indicate the particular opening from which the seed was last dropped.

It is believed the manner of operation of the device will be readily understood by those skilled in the art without further detailed explanation.

Having thus described the invention, what is claimed is:—

1. A seed distributor for planters comprising a rotatably mounted seed drum, drive means for the drum comprising a plate secured to the drum having a gear at its underside, a drive pinion operatively connected with said gear, flanges on said plate forming an annular channel, a ring secured to the plate within the channel, said ring and plate having registered openings, gates controlling said openings and trip means beneath the plate controlling the gates for discharging seed through the openings.

2. A seed distributor for planters comprising a rotatably mounted seed drum, drive means for the drum comprising a plate secured to the drum having a gear at its underside, a drive pinion operatively connected with said gear, flanges on said plate forming an annular channel, a ring secured to the plate within the channel, said ring and plate having registered openings, gates controlling said openings, a stationary plate beneath the drum having a discharge opening therein and trip means adjacent said opening and engageable with said gates for controlling the discharge of seed through said openings.

3. A seed distributor for planters comprising a rotatably mounted seed drum, drive means for the drum comprising a plate secured to the drum having a gear at its underside, a drive pinion operatively connected with said gear, flanges on said plate forming an annular channel, a ring secured to the plate within the channel, said ring and plate having registered openings, gates controlling said openings, a stationary plate beneath the drum having a discharge opening therein, a stationary plate within the drum above said ring and first named plate, said gates being swingable through said openings when the latter are in registered position to discharge seed therethrough and an inclined projection on the lower stationary plate engageable with the gates to close the same.

4. A seed distributor for planters comprising a rotatably mounted seed drum, drive means for the drum comprising a plate secured to the drum having a gear at its underside, a drive pinion operatively connected with said gear, flanges on said plate forming an annular channel, a ring secured to the plate within the channel, said ring and plate having registered openings, gates controlling said openings, a stationary plate beneath the drum having a discharge opening therein, a stationary plate within the drum above said ring and first-named plate, said gates being swingable through said openings when the latter are in registered position to discharge seed therethrough and an inclined projection on the lower stationary plate engageable with the gates to close the same, and indicating indicia on the drum associated with said openings to indicate the opening from which the seed was last dropped.

FRED S. WHITE.